United States Patent
Tuschy et al.

[15] 3,648,553
[45] Mar. 14, 1972

[54] DEVICE FOR TRANSPORTING ELONGATED WORKPIECES

[72] Inventors: Eckhard Tuschy, Osnabrueck; Theodor Niggemann, Sutthausen, both of Germany

[73] Assignee: Kabel-und Metallwerke Gutehoffnungshutte Akteingesellschaft, Hannover, Vahrenwalder Strasse, Germany

[22] Filed: Jan. 22, 1970

[21] Appl. No.: 4,846

[52] U.S. Cl. ................................. 83/112, 83/98, 83/156, 83/158, 83/165, 193/35 R
[51] Int. Cl. ........................................... B23d 21/04
[58] Field of Search ............... 83/156, 112, 149, 165, 158, 83/159, 160, 98; 193/35 R

[56] References Cited

UNITED STATES PATENTS

| | | | |
|---|---|---|---|
| 3,416,644 | 12/1968 | Blake | 193/35 X |
| 1,936,485 | 11/1933 | Schreck | 83/156 |
| 3,459,082 | 8/1969 | Smith et al. | 83/160 X |
| 653,506 | 7/1900 | Edwards | 83/158 X |

*Primary Examiner*—James M. Meister
*Attorney*—Smyth, Roston & Pavitt

[57] ABSTRACT

Elongated workpieces are transported crosswise to the direction in which they leave a cutter, by means rolls having inclined axes to both, that direction and the crosswise direction, and they define a plane inclined to the vertical.

4 Claims, 3 Drawing Figures

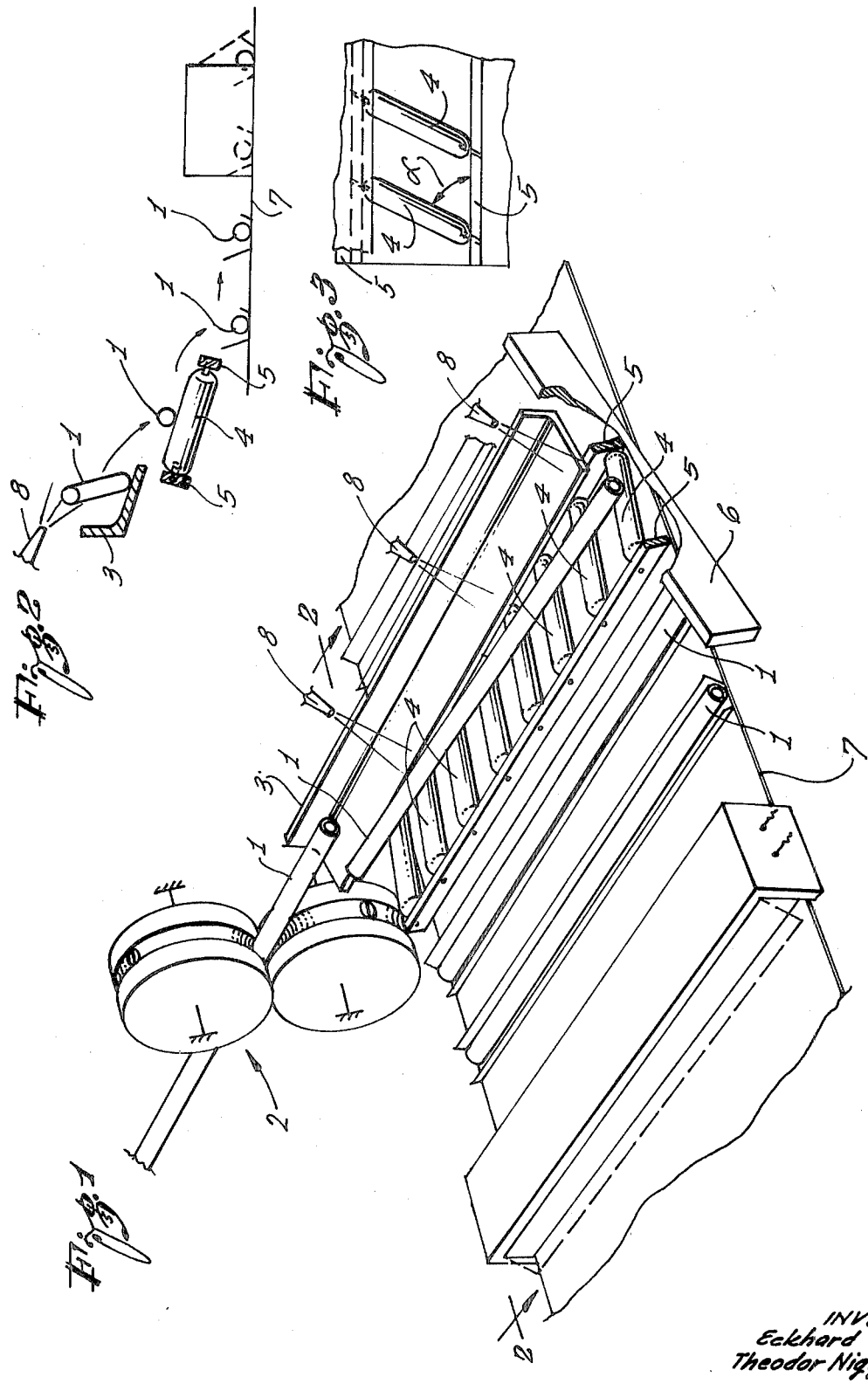

DEVICE FOR TRANSPORTING ELONGATED WORKPIECES

The present invention relates to a device for transporting elongated, preferably profiled workpieces as they appear or arrive, for example, in a particular location in a production line, such as the output side of a cutting device. Equipment for the transportation of elongated pieces is known generally which includes parallel bars, rails or transoms for supporting rolls parallel to each other. In order to change the direction of propagation of arriving workpieces, the transoms are curved so that the rolls are not parallel to each other, but define an angle between them. The overall direction of motion of the workpieces, therefore, follows the direction of extension of the transoms supporting the rolls, i.e., is still transverse to the axes of the rolls and more or less colinear with the direction of rolling. It is, therefore, not possible with this equipment to transport the pieces transversely to the extension of the transoms whether straight or curved.

This is particularly of importance in those cases where there is very little space in continued direction of the longitudinal direction of the elongated workpieces at the location of arrival. For example, particular elongated and profiled workpieces are cut, by means of a cutting device from very long elongated pieces or a continuous string; there may be not much space behind the cutter particularly if the length of the pieces so cut is still rather large.

The present invention has its principle task to obviate this disadvantage and is concerned, for example, with construction of the propagation path for elongated workpieces as they leave for example a cutter. In accordance with the present invention it is suggested that a plurality of straight transoms are disposed parallel to each other and more or less parallel to the direction of arrival of the elongated workpieces at a particular location. Rolls are supported by these transoms and they are also parallel to each other, but the axes of the rolls form an angle with the direction of extension of the transoms which is smaller than 90°. This way it is possible to actually transport the elongated pieces transversely to the direction of extension of the transoms. This is of particular advantage if space limitations require, for example, cut workpieces to be moved transverse to the direction in which they propagate through the cutter. In order to have the elongated pieces roll still better transversely to the direction of the transoms, it is of advantage, to provide a tray with waxened bottom into which the pieces drop when leaving the cutter, and to have the plane as defined by the rolls somewhat inclined relative to the waxened bottom.

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 1 illustrates somewhat schematically a perspective view from the top of equipment in accordance with the preferred embodiment of the present invention;

FIG. 2 is partially a side view but taken in a sectional plan 2—2 in FIG. 1; and FIG. 3 illustrates a straight-down top view of a portion of the equipment shown in FIG. 1.

Proceeding now to the detailed description of the drawings, in FIG. 1 thereof, there is illustrated a string of material such as tubular string or an elongated rod which traverses a cutting equipment 2 in which it is cut to elongated pieces 1, preferably of similar lengths. A representative example for such a cutting equipment is disclosed, for example, in copending application Ser. No. 5669, filed Jan. 26, 1970. The cutter outlet side is the location of arrival of these elongated pieces 1 within the production line involving them, their initial manufacturing and/or subsequent processing.

The cut elongated pieces 1, when leaving the cutter, actually right after cutting, drop onto a slide or tray 3. As the tray's bottom is inclined to the vertical, the pieces 1 slide down and onto rolls 4. These rolls are parallel to each other, i.e., they have parallel axes and provide colinear conveyor motion to transport the cut pieces further. There are provided two straight rails or transoms 5 for journaling the rolls 4. The straight transoms extend, at least essentially, parallel to the direction in which the cut pieces 1 leave cutter 2. However, the transoms 5 form an angle with the axes of rolls 4 which is smaller than 90°. The angular relationship can best be seen from FIG. 3. The rolls, thus, provide conveyor motion which is at an angle $\alpha$ relative to the direction in which a piece 1 left the cutter. Accordingly, the cut pieces 1 are transported transversely to the transoms 5 and, particularly, at an angle equal to 90°−$\alpha$. Accordingly, the workpieces 1 assume directly a right-angle component of motion relative to the direction in which they fell into tray 3 after leaving cutter 2. Before a cut piece 1 reaches a stop 6 it drops upon a crosswise moving conveyor element 7 and is transported further to a location in which it may additionally be subject to working.

The equipment includes additionally a nozzle 8 blowing an airjet against the cut pieces 1, for providing thereto additional motion transverse to the extension of the transoms, so that they slide better on the waxened bottom of tray 3. The rolls 4 are illustrated in FIG. 2 to define a plane which is parallel to the waxened bottom of the tray but, actually, there should be provided a slight inclination to that bottom to additionally support the cross motion.

The invention is not limited to the embodiments described above but all changes and modifications thereof not constituting departures from the spirit and scope of the invention are intended to be included.

We claim:

1. In a production line for elongated workpieces, there being a location of arrival of an elongated workpiece from which individual workpieces are cut in sequence and to be transported further in a direction transverse to the direction of propagation at the point of arrival, the combination comprising:

a plurality of straight transoms, disposed in relation to and below the location of arrival and in parallel relation to each other and extending at least essentially in parallel direction to the direction of motion of the pieces at such location of arrival;

a plurality of rolls disposed for journaling support by the transoms about parallel axes, inclined at an angle of less than 90° relative to the direction of extension of the transoms and disposed below the location of arrival so that an elongated piece falls onto the rolls, the rolls imparting upon the pieces conveyor motion that has a component in said transverse direction so that the pieces roll laterally off the rolls; and means disposed next to the rolls in said transverse direction to convey the elongated pieces as rolled by the rolls off the rolls, further in said transverse direction, that is also transverse to said transoms.

2. In the combination as set forth in claim 1, there being a receiving tray behind the location of arrival having an inclined bottom, the rolls defining a plane, inclined to the vertical for the workpieces to roll off the rolls, laterally in relation to the transoms.

3. In the combination as in claim 2, the plane being slightly inclined relative to the bottom.

4. In a production line as in claim 1, there being means for cutting elongated workpieces with particular cross-sectional profile from elongated workpieces of larger length, the cutting means defining the location of arrival as its outlet, from which the elongated pieces as cut drop into an inclined elongated tray, the rolls disposed for transporting the unit pieces transversely to their direction of extension.

* * * * *